United States Patent [19]

Folino

[11] Patent Number: 5,514,045
[45] Date of Patent: May 7, 1996

[54] SPEED CONVERTER WITH ZERO BACKLASH

[75] Inventor: Frank A. Folino, Weston, Mass.

[73] Assignee: Synkinetics, Inc., Bedford, Mass.

[21] Appl. No.: 16,506

[22] Filed: Feb. 11, 1993

Related U.S. Application Data

[63] Continuation-in-part of Ser. No. 670,263, Mar. 14, 1991, Pat. No. 5,312,306, and a continuation-in-part of PCT/US92/02023, Mar. 13, 1992.

[51] Int. Cl.$^6$ .......................... F16H 21/12; F16H 13/04; F16H 13/08
[52] U.S. Cl. .................. 476/36; 475/196; 74/63
[58] Field of Search .................. 476/36, 61; 475/196; 74/63

[56] References Cited

U.S. PATENT DOCUMENTS

| | | | |
|---|---|---|---|
| 1,568,290 | 1/1926 | Morison | 475/196 |
| 2,512,272 | 6/1950 | Gull | 476/36 |
| 2,565,828 | 8/1951 | Vivie | 476/36 X |
| 3,039,324 | 6/1962 | Waterfield | 476/36 |
| 3,049,019 | 8/1962 | LaPointe et al. | 476/36 X |
| 3,468,175 | 9/1969 | Rabek | 476/36 |
| 3,807,243 | 4/1974 | Yada | 476/36 |
| 4,584,904 | 4/1986 | Distin, Jr. et al. | 476/36 |
| 4,643,047 | 2/1987 | Distin et al. | 476/36 |
| 4,960,003 | 10/1990 | Hartley | 476/36 |
| 5,016,487 | 5/1991 | Bollmann | 476/36 |
| 5,183,443 | 2/1993 | Murakami et al. | 475/196 X |

FOREIGN PATENT DOCUMENTS

| | | | |
|---|---|---|---|
| 5887 | 12/1979 | European Pat. Off. | 476/36 |
| 24020 | 2/1922 | France . | |
| 1021945 | 2/1953 | France . | |
| 2546009 | 4/1976 | Germany | 476/36 |
| 59-133863 | 8/1984 | Japan . | |
| 59-180153 | 10/1984 | Japan . | |
| 168954 | 9/1985 | Japan | 475/196 |
| 5-203009 | 10/1993 | Japan | 475/196 |
| 629387 | 9/1978 | U.S.S.R. . | |
| 1206528 | 1/1980 | U.S.S.R. | 475/196 |
| 1257331 | 9/1986 | U.S.S.R. . | |
| 1399548 | 12/1986 | U.S.S.R. . | |
| 1368545 | 1/1988 | U.S.S.R. . | |
| 399548 | 5/1988 | U.S.S.R. | 475/196 |
| 1490362 | 6/1989 | U.S.S.R. . | |
| 1569470 | 6/1990 | U.S.S.R. . | |
| 1618940 | 1/1991 | U.S.S.R. | 475/196 |
| 710543 | 6/1952 | United Kingdom . | |
| 1198467 | 7/1970 | United Kingdom | 475/196 |

OTHER PUBLICATIONS

Abstract, Japan, Patent, 60-179563(A) Sep. 13, 1985.

Abstract, Japan, Patent, 60-129462(A) Jul. 10, 1985.

Abstract, Japan, Patent, JP890072449 Mar. 24, 1989.

Mechanical Engineering & Technology Guide Balls Reduce Speed and Transmit Torque; publ. prior to Mar. 14, 1991.

Dogen™ Precision Rotary Actvator Designer's Guide, (Dir. of Lenze, Woburn, MA); publ. prior to Mar. 14, 1991.

Soviet Engineering Research vol. 6 (1986) Feb., No. 2, pp. 23–26, Mobray, Leicestershire GB; V. Machinostroeniya: "Gen'l Info . . . ".

Abstract, Japan, Patent, 60-146954(A) Aug. 2, 1985.

Abstract, Japan, Patent, 60-4663(A) Jan. 11, 1985.

Primary Examiner—Dirk Wright
Assistant Examiner—Khoi Q. Ta
Attorney, Agent, or Firm—James E. Maslow

[57] ABSTRACT

Method and apparatus for reducing backlash in a speed converter using balls to interact between input and output cams. Preferred embodiment features two-point contact of balls by drive input and driven output cam tracks under axial preload.

18 Claims, 10 Drawing Sheets

5,514,045

SPEED CONVERTER WITH ZERO BACKLASH

BACKGROUND OF THE INVENTION

This application is a continuation-in-part of U.S. patent application Ser. No. 670,263, filed Mar. 14, 1991, Attorney Docket Number FFY-001, entitled: SPEED CONVERTER, incorporated herein by reference, and PCT Patent Application Ser. No. PCT/US92/02023, filed Mar. 13, 1992, Attorney Docket Number FFY-001PC, entitled: SPEED CONVERTER, incorporated herein by reference.

The present invention relates to mechanical power transmissions, and more particularly, to speed reducers and the like for use between a drive and driven shaft.

Speed conversion is an important capability in the efficient utilization of rotary motive force. The occasion often arises for increasing or reducing of the speed of a drive member to a higher or lower speed at a driven member. In automobiles, for example, a hydraulic transmission, with various combinations of gear assemblies, accomplishes the task of translating the high rotary speed of the gasoline engine to the lower rotational requirements at the driven axle. Typically, such transmissions are quite complex, requiring many parts to operate in sophisticated syncopation, and are quite labor intensive for both assembly and service.

Other speed conversion applications include elevators, where an electric motor typically is employed for lifting and lowering the elevator cab, and robotics, where an electric motor is employed as an actuator to effect motion. These applications often require a zero backlash arrangement (ideally at zero degrees of freedom in the coupling between rotary input and output) so as to be able to achieve a desired level of driven member position control during operation.

It is therefore an object of the present invention to provide a speed converter which is simplified in nature but is robust in transmission capability.

It is another object of the present invention to provide a speed converter with zero backlash.

It is another object of the present invention to provide a speed converter having an auto braking feature.

It is a further object of the present invention to provide a speed converter which is relatively easy to assemble and service.

It is yet an additional object of the present invention to provide optimized load sharing among the multi-elements that transmit the rotary motive force in a speed converter.

It is still an additional object of the present invention to provide means for accommodating wear of the cams and balls of an extended-life speed.

SUMMARY OF THE INVENTION

These and other objects are well met by the presently disclosed, highly efficient, speed converting power transmission assembly of the present invention. In one embodiment, apparatus is provided for translating rotation and angular velocity of a rotary input drive to rotation and angular velocity of a rotary output drive. The translating apparatus comprises a conjugate pair of devices rotatable about a common axis and translating means for translating rotary motion and angular velocity of a first of the devices to rotary motion and angular velocity of a second of the devices. The first device is for coupling to an input drive and is for interacting with an input of the translating means and the second of the devices is for coupling to an output drive for reacting with an output of the translating means. The translating means includes a retainer having at least one slot for oscillation of an interacting element (such as a ball) in the slot, the retainer being located between the conjugate pair about the common axis, wherein the interacting element couples the first device to the second device. As a result, the rotary motion and angular velocity of the first device is efficiently translated by the translating means into rotary motion and angular velocity of the second device. Axial preloading is provided for higher precision and extended lifetime.

In one embodiment of the invention, the conjugate face cams of the speed converter comprise, firstly, an input disk mounted on an input shaft, wherein the disk has a face that extends radially perpendicular to the shaft. This face contains a grooved cam track forming a face cam track. This face cam track is configured as a drive cam, in simplest form, with one lobe starting at a base circle radius and proceeding rotatably about the center of the disk and shaft at a constantly increasing radius and at a constant angular rotation to a maximum radius at 180°, i.e., in the rise mode, and then proceeding rotatably in the fall mode at a decreasing radius of the same rate and constant angular rotation as in the rise mode back to the original base circle radius, completing 360° of rotation.

Next, the driven cam comprises an output shaft and disk, similar to the disk of the drive cam with a face cam track, and is mounted along the shaft in a position facing the face cam track of the drive cam. The driven face cam contains a plurality of rise and fall modes that are selected to achieve a desired speed conversion, which in this case is in ratio with the single lobe of the drive cam. Each rise and fall mode of the plurality of cycles in the driven cam are configured to have the same radial displacement, for uniform conversion. Alternatively, such radial displacement may be varied for non-uniform conversion.

In this embodiment, adjustable means are provided for axially preloading the drive cam with axial force biasing. In a preferred embodiment, parallel tracks are provided on the drive cam and on the driven cam.

In the preferred embodiment, apparatus for converting a rotary motion input to a rotary motion output is provided with minimized backlash. A drive track for driving a driven track via interacting elements guided by a retainer enables each of the tracks to make one-point contact with the interacting elements, and this effectuates an axially preloading arrangement for axially preloading the tracks and the interacting elements together to reduce or eliminate backlash. Preferably two-point contact is made.

Variations of the invention include: wherein the interacting elements are balls and the retaining means is a slotted reaction disk; wherein one track forms an angled flank for one-point contact; wherein the driven track is irreversible; wherein one track includes a flank capable only of unidirectional interaction with the other the track; wherein the apparatus has a housing in which a first of the tracks is slideably mounted over a shaft axis and the other track is relatively unslideable over the axis relative to the housing; wherein the retainer is fixed to the housing; wherein a spring means provides axial preload; wherein a spring means provides axial preload via external adjusting screws which compress the spring means between an inner wall of the housing through an angular contact bearing and a backface of one of the tracks; wherein the backface is a backface of the drive means; wherein the backface is a backface of the driven track; wherein the tracks comprise a drive cam track and driven cam track, each having an angled flank for one-point interaction with the interacting elements; wherein the interacting elements are balls and the retainer is a slotted reaction disk and the drive cam track transmits the force Of the compression springs to the driven cam track through a group of the balls which are located in the slots of the reaction disk, respectively; and wherein the group of balls is a double row, and two of the balls are assigned to each slot and wherein at least one of the angled flanks comprises a plurality of flank segments.

Additional variations include: wherein the tracks are a conjugate pair of devices rotatable about a common axis, a first device of the pair being an input device for supply of angular velocity and rotary motive force and a second device of the pair being an output device, the retainer and the interacting elements being means for transmitting angular velocity and rotary motive force of the input device to angular velocity and rotary motive force of the output device as the interacting elements are put in motion by the input device, and the input device cooperating with the in-motion interacting elements and the output device for transmitting, through all the in-motion interacting elements, the angular velocity and rotary motive force of the input device to angular velocity and rotary motive force of the output device; wherein the transmitting through all the in-motion interacting elements is done substantially equally and simultaneously through all the in-motion interacting elements; wherein the drive track comprises a drive cam track expressible as a linear function.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF A PREFERRED EMBODIMENT

Figure 1A:
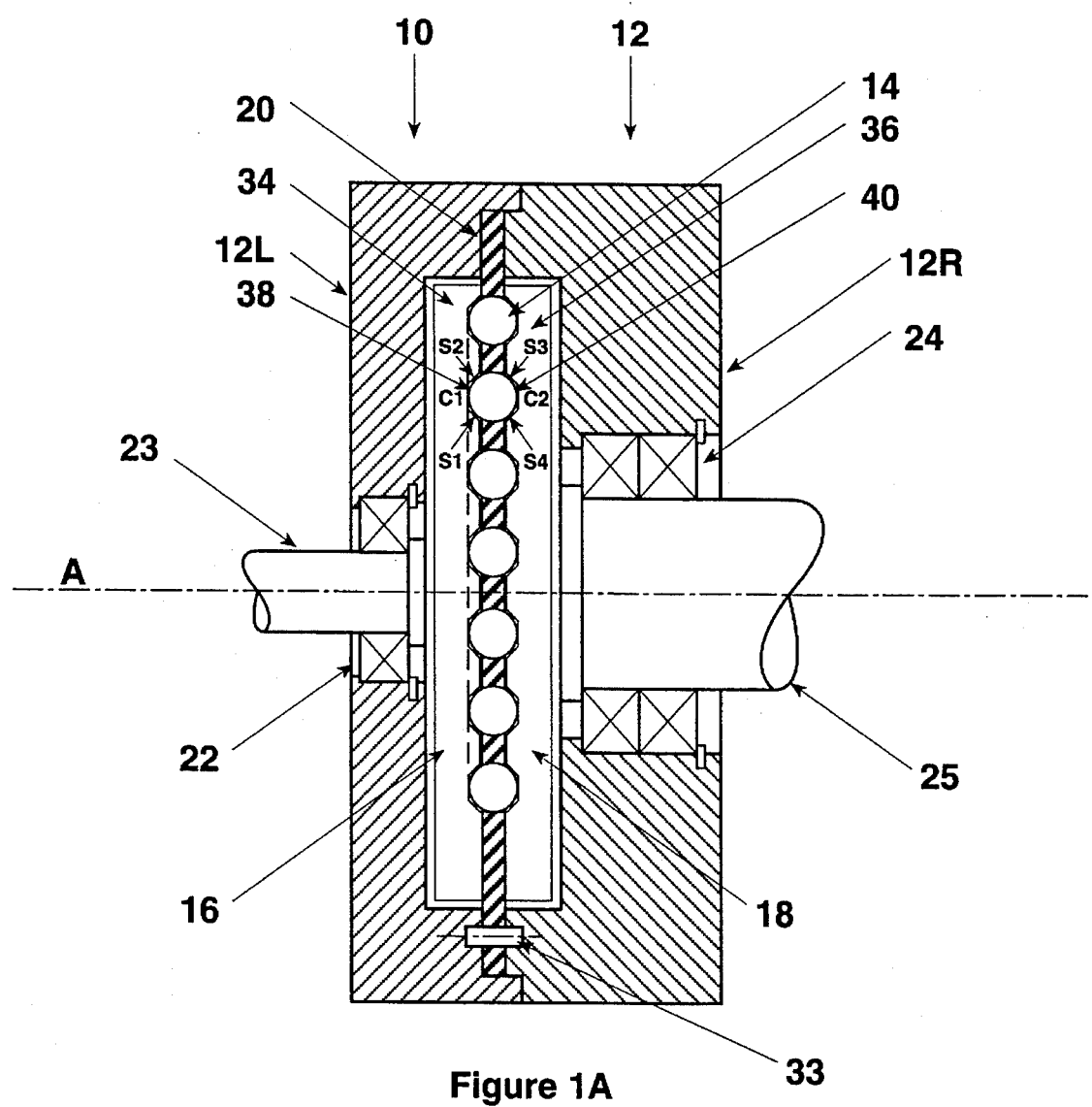
FIG. 1A is a sectional view on the centerline of a single stage speed reducer.

An illustrative single-stage speed converter apparatus 10 is shown in FIG. 1A, having housing parts 12L and 12R of a housing 12, a plurality of interacting elements, i.e., balls 14, a drive member 16 coupled to an input shaft 23, a driven member 18 coupled to an output shaft 25, and a reaction disk 20 coupled to housing 12. Drive member 16 is mounted in housing 12 by means of an input bearing or bushing arrangement 22 and driven member 18 is mounted in housing 12 by means of output bearing or bushing arrangement 24. Preferably the drive member and the driven member are each symmetrical about the drive axis A.

Figure 2:
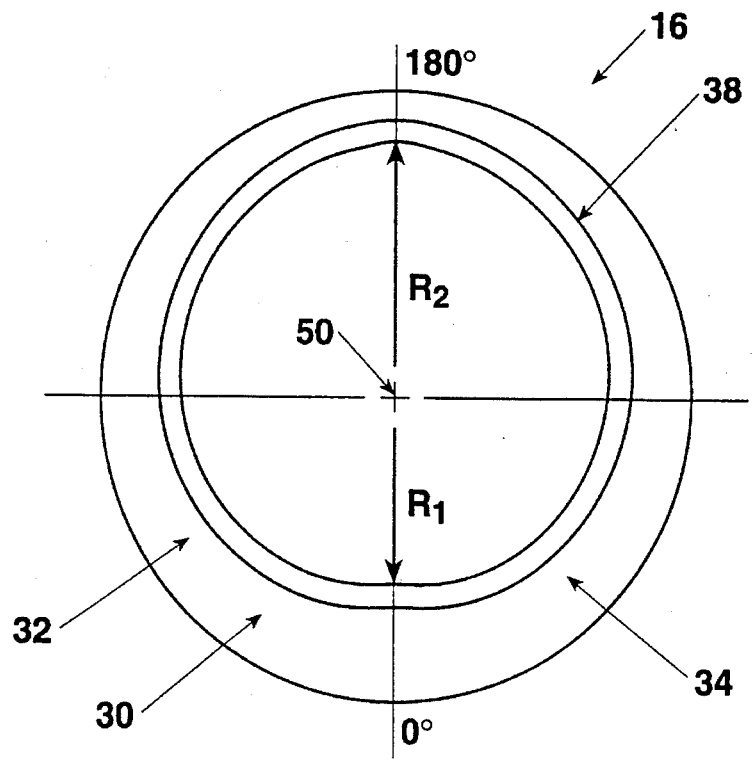
FIG. 2 is a plan view of a single cycle drive member face cam according to the reducer of FIG. 1A.
Figure 3:
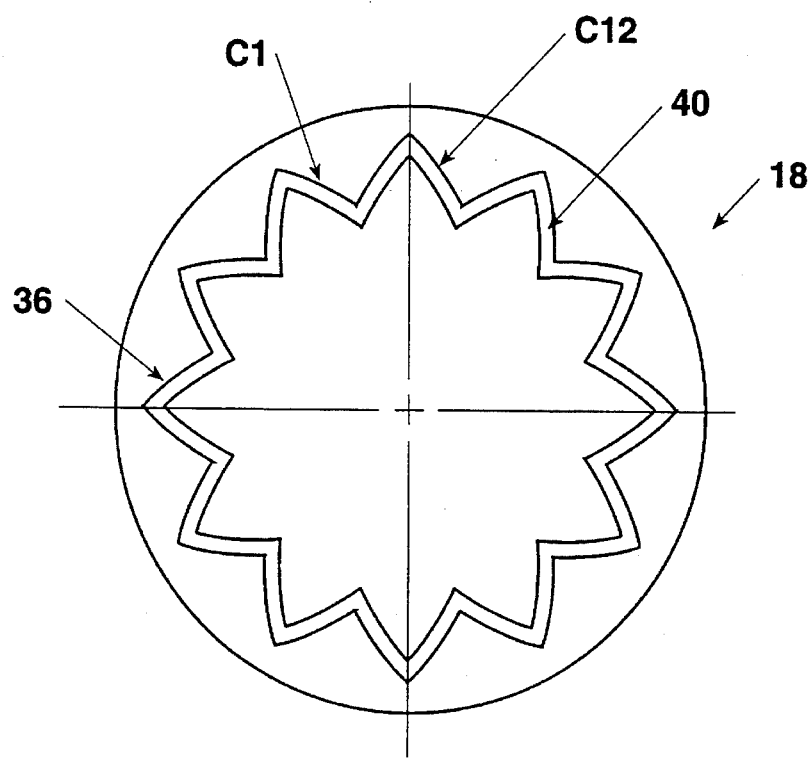
FIG. 3 is a plan view of a twelve cycle driven member face cam according to the reducer of FIG. 1A.

The speed reducing and power transmission capability of the assembly is achieved by use of appropriately designed face cams on each of the drive member and driven member, wherein the cams are interacted by the balls. FIGS. 2 and 3 are examples of two such cams of the apparatus of FIG. 1A, and are shown by way of illustration and not by way of limitation of the scope of the present invention.

As seen in FIG. 2, drive member 16 includes a single cycle (single lobe) cam 30 which rises from R1 at 0 degrees to R2 at 180 degrees (defining the rise side 32 of the cam) and back to R1 at 360 degrees (defining the fall side 34 of the cam). The cam is asymmetric about the vertical centerline and is generated from R1 to R2 in a prescribed curve relative to the center 50. The cam takes the form of a one cycle ball track 38.

As shown in FIG. 3, driven member 18 is preferably concentric to the shaft. In this embodiment, member 18 includes a 12 cycle (C1–C12) cam 36, taking the form of a concentric 12 cycle ball track 40. Each one of these 12 cycles accommodates the rise and fall of the single cycle drive cam, and each such accommodation rotates the driven member ½ of a full revolution of the driven member, in this embodiment.

Figure 4:
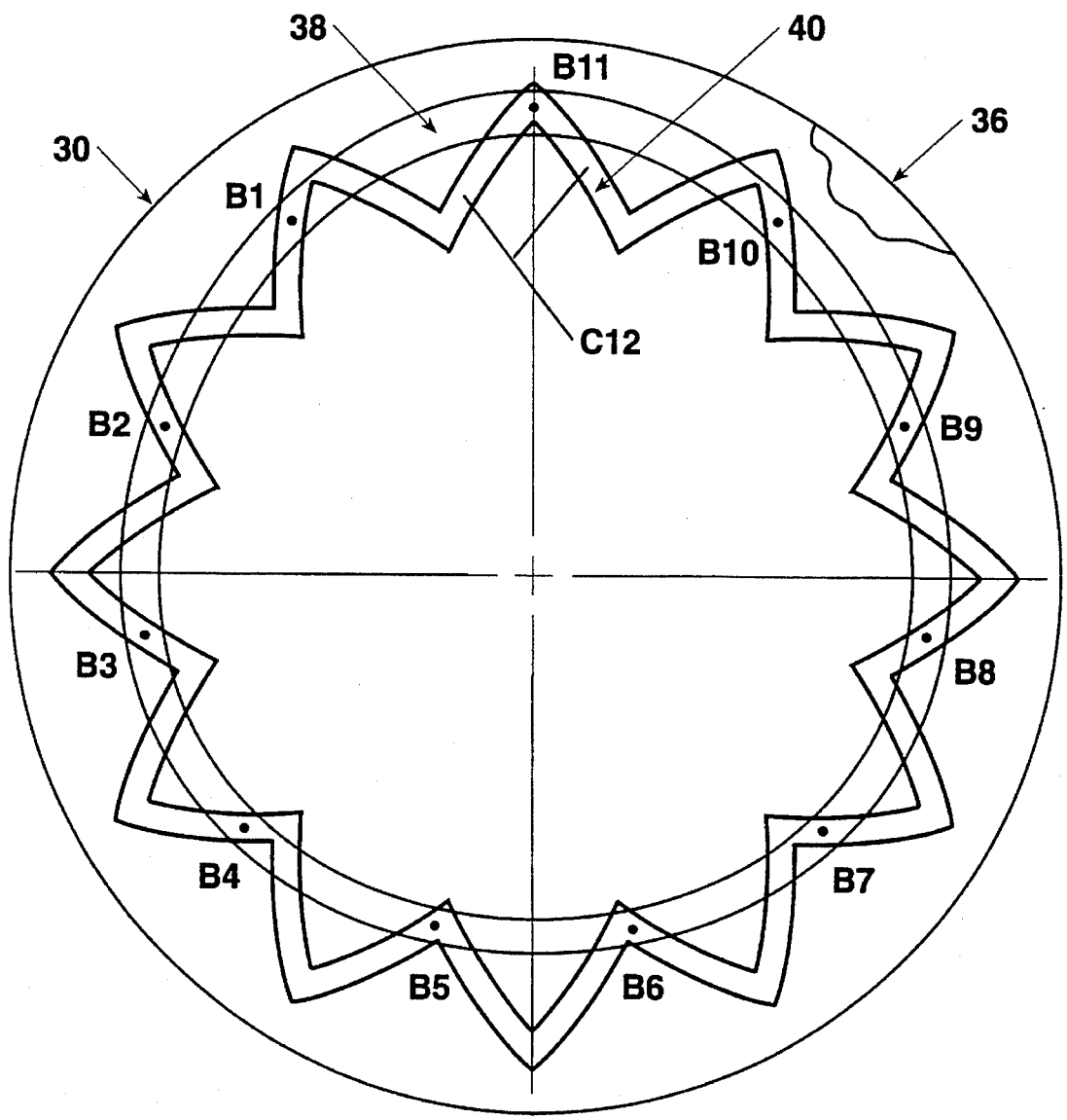
FIG. 4 is a conceptual overlay of the single cycle drive member of FIG. 2 and the twelve cycle driven member of FIG. 3.

The cooperation of the two cams of this embodiment is profiled in the overlay of FIG. 4. Cams 30 and 36, and specifically ball tracks 38, 40, are configured so as to support balls 14 between them at locations B1 to B11. The balls are retained in these assigned locations by reaction disk 20, as more particularly shown in FIG. 5. In this embodiment, the reaction disk is provided with a plurality of radial ball travel slots S1–S11, each slot being placed equidistant from its nearest neighbors and from the center 50 of the retainer.

The slots as shown are spaced to accommodate the maximum number of balls. Fewer balls can be used in slots at angles from each other that are not necessarily equal but cannot be less than the subtended angle of each driven cam cycle. (In this embodiment of 12 cycles for the driven cam, the subtended angle is 30°.)

Figure 5:
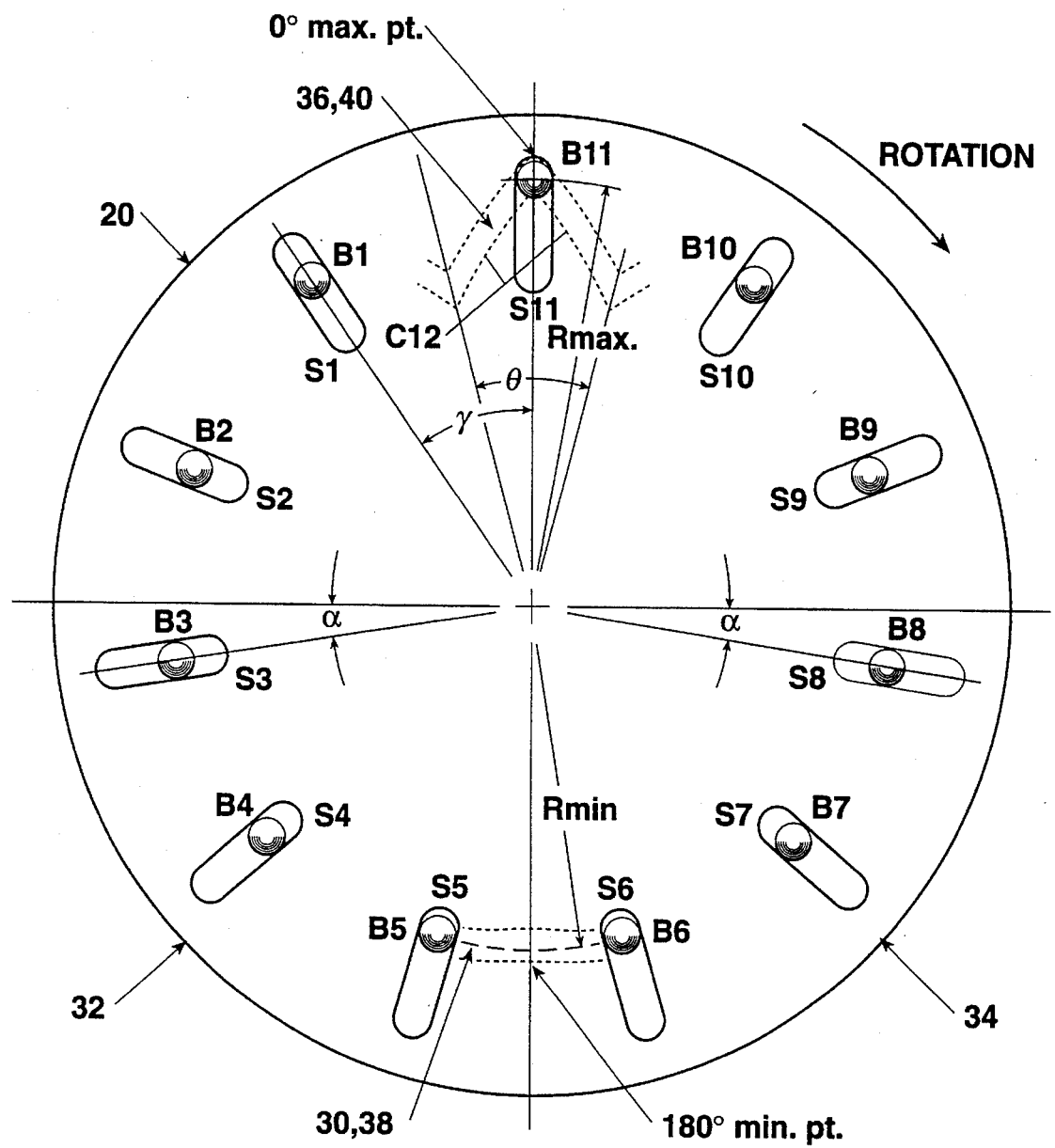
FIG. 5 is a plan view of a slotted reaction disk with balls installed according to the speed reducer of FIG. 1.

The reaction disk of FIG. 5 has several functions. The first is to provide a reaction to the rotary motive forces that are being transmitted through the balls. The reaction disk is also utilized during the assembly procedure of the speed reducer in that it will locate and retain the balls in their proper orientation and align the cams. Thirdly, at the extreme travel of the balls in slots S1–S11, the balls are assisted in their transition from a rise mode to a fall mode and in reverse.

In operation of this embodiment, the balls 14 translate rotation of input shaft 23 and drive member 16 in a given direction (e.g., clockwise, as viewed from the input shaft), to a lower rotation of driven member 18 and output shaft 25 in the opposite direction, as viewed from the output shaft. The balls translate inwardly and outwardly radially during rotation of the cams. In this embodiment there is no angular rotation of the balls or the retainer (reaction disk 20) since disk 20 is structurally coupled, see pin 33, to the stationary housing 12. The only rotating elements are the drive and driven cams, although in other embodiments the retainer can be ungrounded.

FIGS. 1–5 illustrate a speed reducer with a drive cam with a single lobe, but a greater number of drive cam lobes is also within the scope of the invention. For example, a four lobe cam combined with the twelve lobe driven cam 36 optimally would have 8 balls (12 cycles minus 4 cycles), and would have a speed ratio of 3:1 (4 cycles drive/12 cycles driven). Hence, it can be seen that by varying the number of cycles on either cams, many combinations of speed ratios are possible. As well, speed increasers may be made accordingly. Furthermore, non-integer rations are also possible in practice of the invention.

In FIG. 1A, balls 14 are held in four-point contact between ball tracks 38', 40' of the drive and driven cams 34, 36. These ball tracks are formed by a center portion bounded by two angularly offset flank or side portions. (In side view these center and side portions appear somewhat as if they form three adjoining sides of an octagon.) Ball 14 contacts the two angled flanks S1, S2 of the drive cam track 38 and the two angled flanks S3, S4 of the driven cam track 40, with clearances between the balls and the center portions C1, C2 of the drive and driven tracks. However, very careful application of axial preload is required so that the balls are not held too tightly by the effect of four-point contact.

Figure 1B:
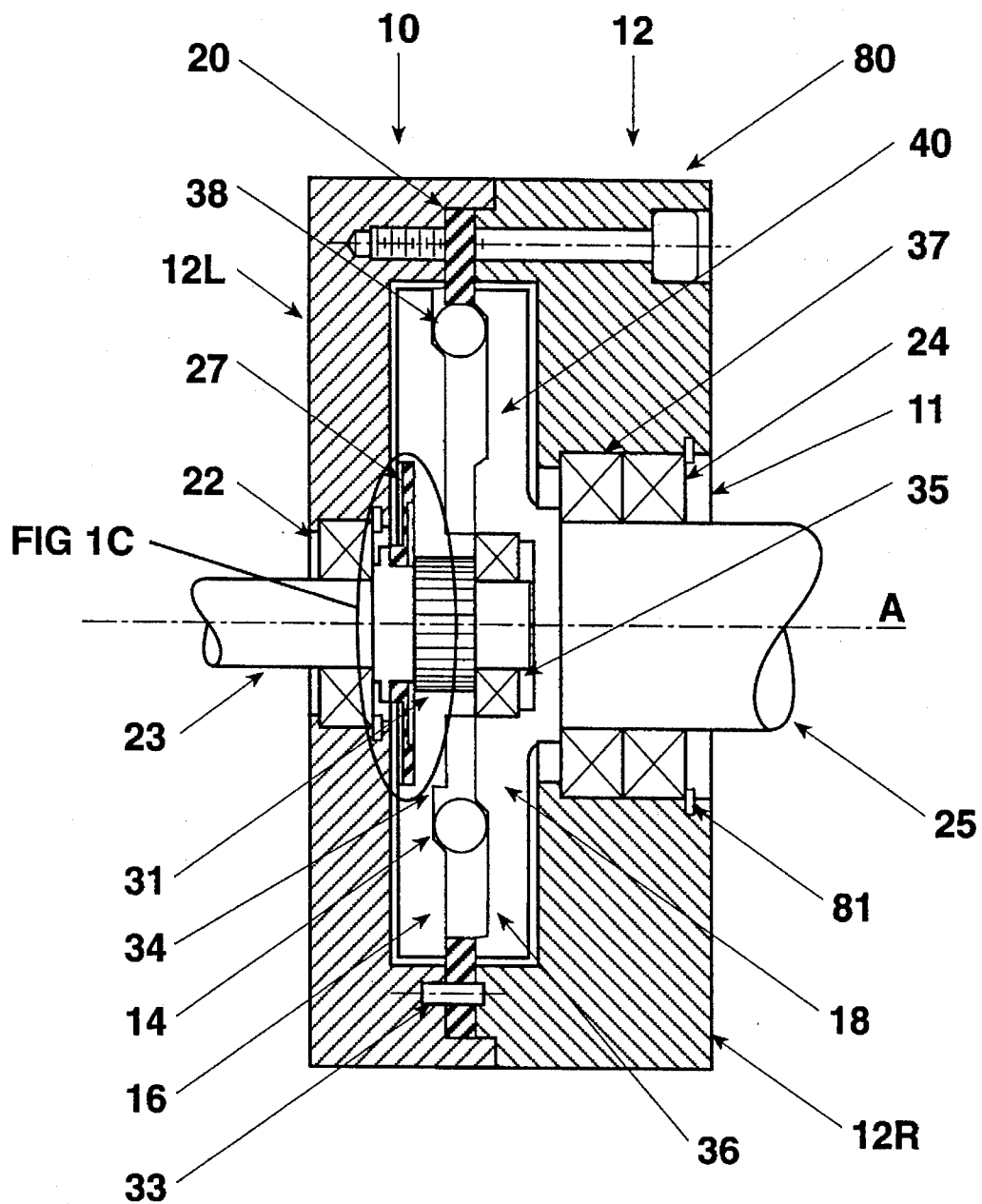
FIG. 1B is a sectional view on the centerline of an axially preloaded speed converter according to the invention.
Figure 1C:
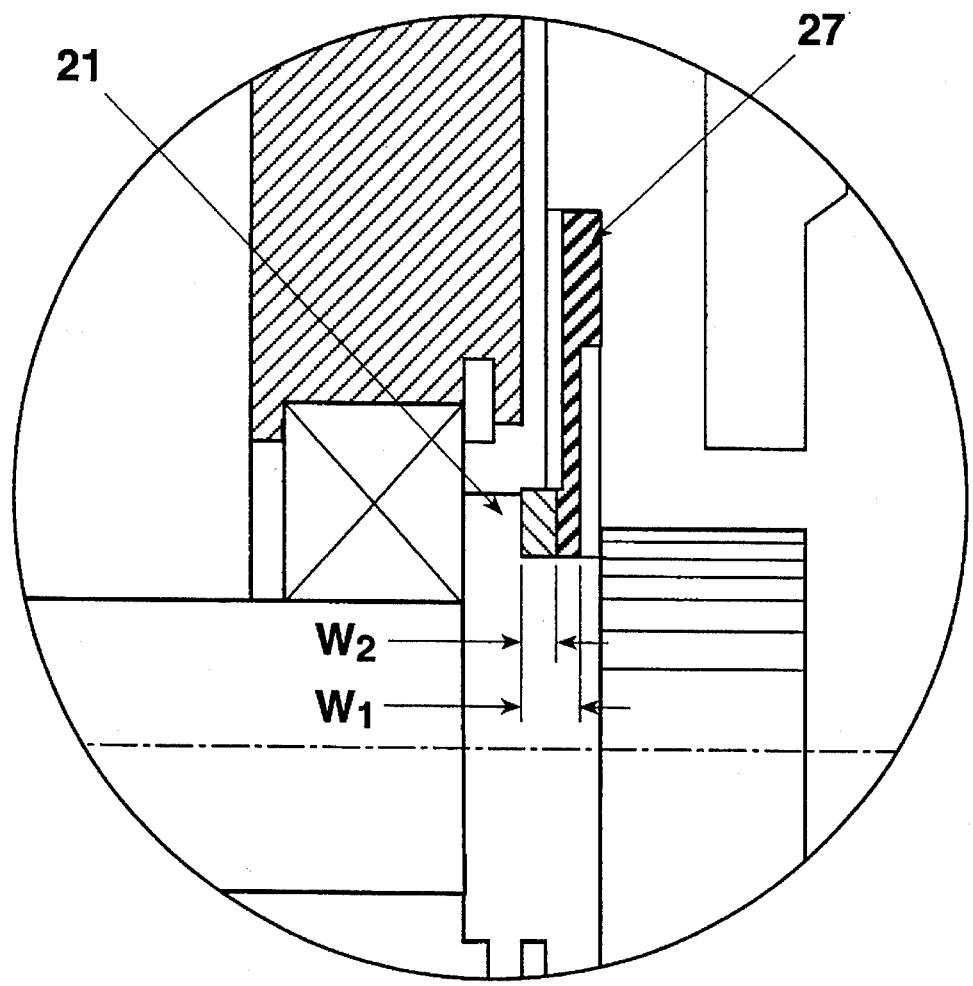
FIG. 1C shows the shim and multi-fingered spring of FIG. 1B in greater detail.

An apparatus 10' is shown in FIG. 1B having several parts common to the embodiment of FIG. 1A, which are commonly numbered. In addition, a compliant, multi-fingered leaf spring unit 27 applies an axial preload to the drive cam 38 (which can slide along the spline 31), and in turn applies an axial force to the balls against the driven cam 40. The driven cam is prevented from moving axially since its location is fixed to the housing 12, by its locked bearing.

The multi-fingered axially compliant spring 27 applies an axial compressive force which is variable in proportion to the width $W_1$. As will be understood from review of FIGS. 1B and 1C, the more width $W_1$ is increased, the higher the compressive force will be. This can also be accomplished by varying the width of a shim 21 at width $W_2$. The shim can be given a predetermined thickness to achieve the required preload condition. The shim can be replaced at any time for one of a different width to change the amount of preload. The multi-fingered compliant member can also be changed to a different spring constant without changing either $W_1$ or $W_2$. As wear occurs on the tracks and balls, the preload, which is designed to accommodate this phenomenon, will maintain the balls and tracks in contact with minimized or essentially zero backlash.

This preloading achieves intimate and continuous contact between the cams and balls, essentially without axial play and backlash. The preloading essentially permits tolerances to be relaxed for precision assemblies and eliminates the effect of tolerance accumulation in an assembled stack of such reducers. A further benefit of preloading is accommodation of any wear in the elements of these units without effecting performance.

Figure 6:
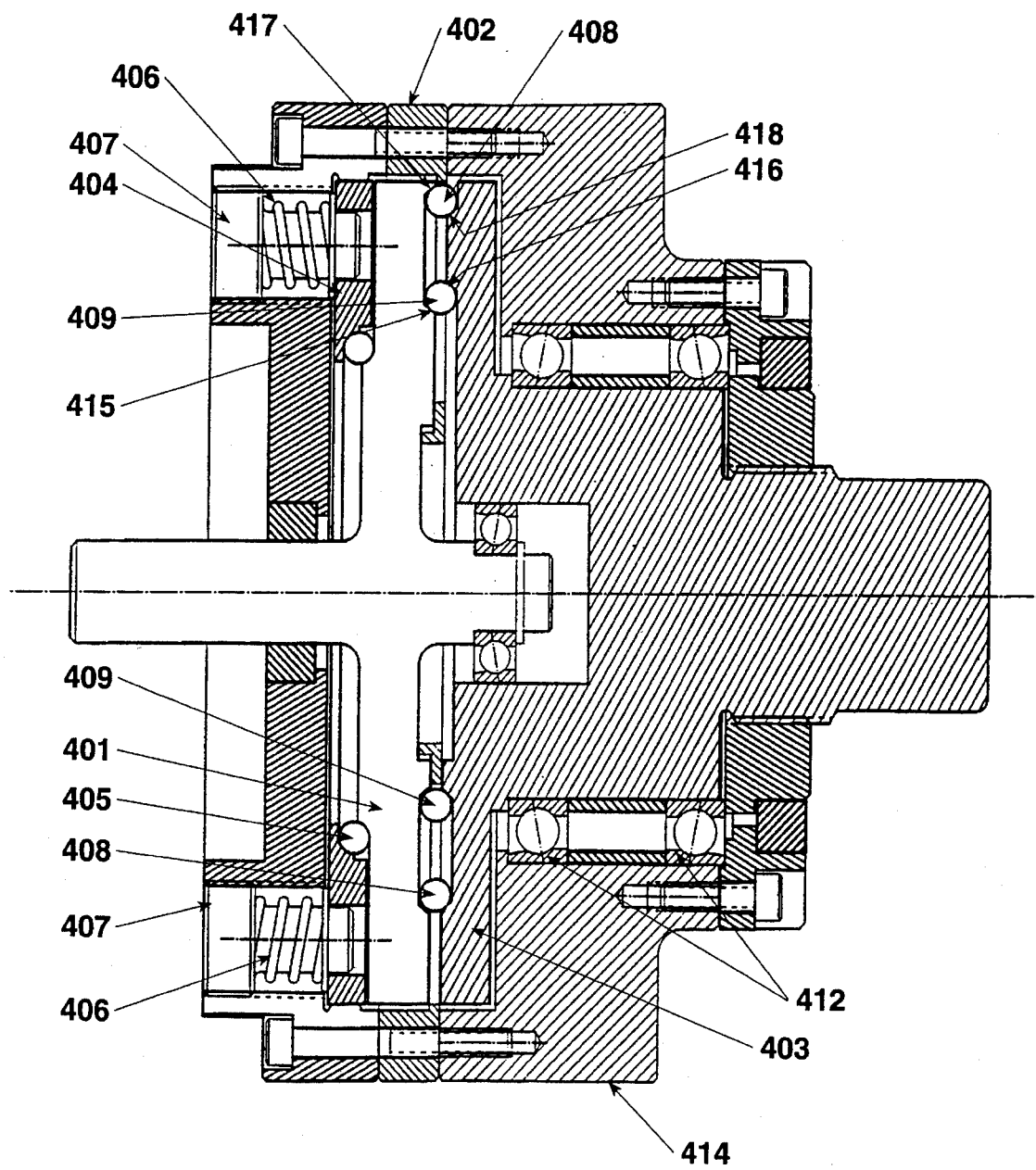
FIG. 6 is a sectional view on the centerline of a preferred axially preloaded speed converter according to the invention.

A preferred embodiment of an axially preloaded speed converter is illustrated in FIG. 6. This converter is capable of being axially preloaded and calibrated by external adjusting screws even while in operation. Adjustment screws 407, when torqued, will compress springs 406 which apply a force to preload plate 404. A symmetrical pattern of such screw assemblies, all calibrated by a preset torque wrench, will result in a uniformly distributed load over the preload plate 404. The force on the preload plate 404 will apply the axial preload to the drive/driven cam devices through the angular contact bearing 405. The stationary race of the angular contact bearing is the preload plate 404 and the rotating race is the adjacent backface of the drive cam device 401.

The drive cam device in turn transmits the axial force to the driven cam device 403 through a double row of balls 408 and 409 which are located in associated slots of reaction disk 402. The driven cam device 403 is axially restrained by the output shaft bearings 412 which are fixedly mounted in the speed converter housing 414. The rise (415R/417R) and fall (415F/417F) portions of drive groove flanks 415 and 417 of the drive cam device 401 are shown in FIG. 7, and the rise (416R/418R) and fall (416F/418F) portions of driven groove flanks 416 and 418 of the driven cam device 403 are shown in FIG. 8.

This two-point contact is illustrated in FIG. 6 between cam grooves 415/416 and 417/418, and shows the two-points of contact with the balls 408 and 409 for the concentric set of cam tracks 415–418. They are similar to two angular contact bearings. In any event, this two-point contact includes a single point of contact from each of the drive and driven cam tracks of each set of tracks, although a less desirable practice of the invention might use three-point contact.

Figure 7:
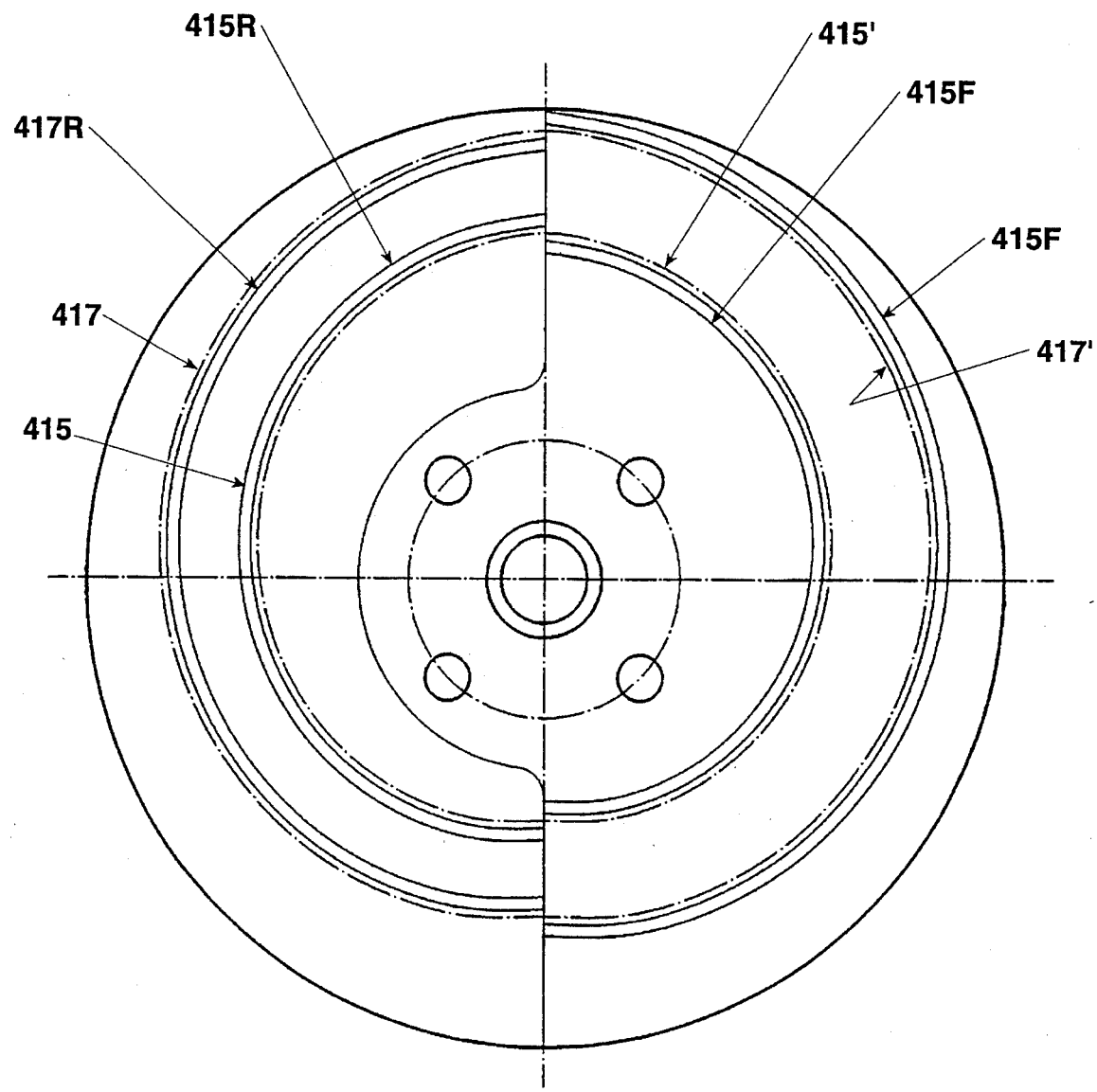
FIG. 7 is a face view of drive grooves 415 and 417 of the drive can device 401 of FIG. 6.
Figure 8:
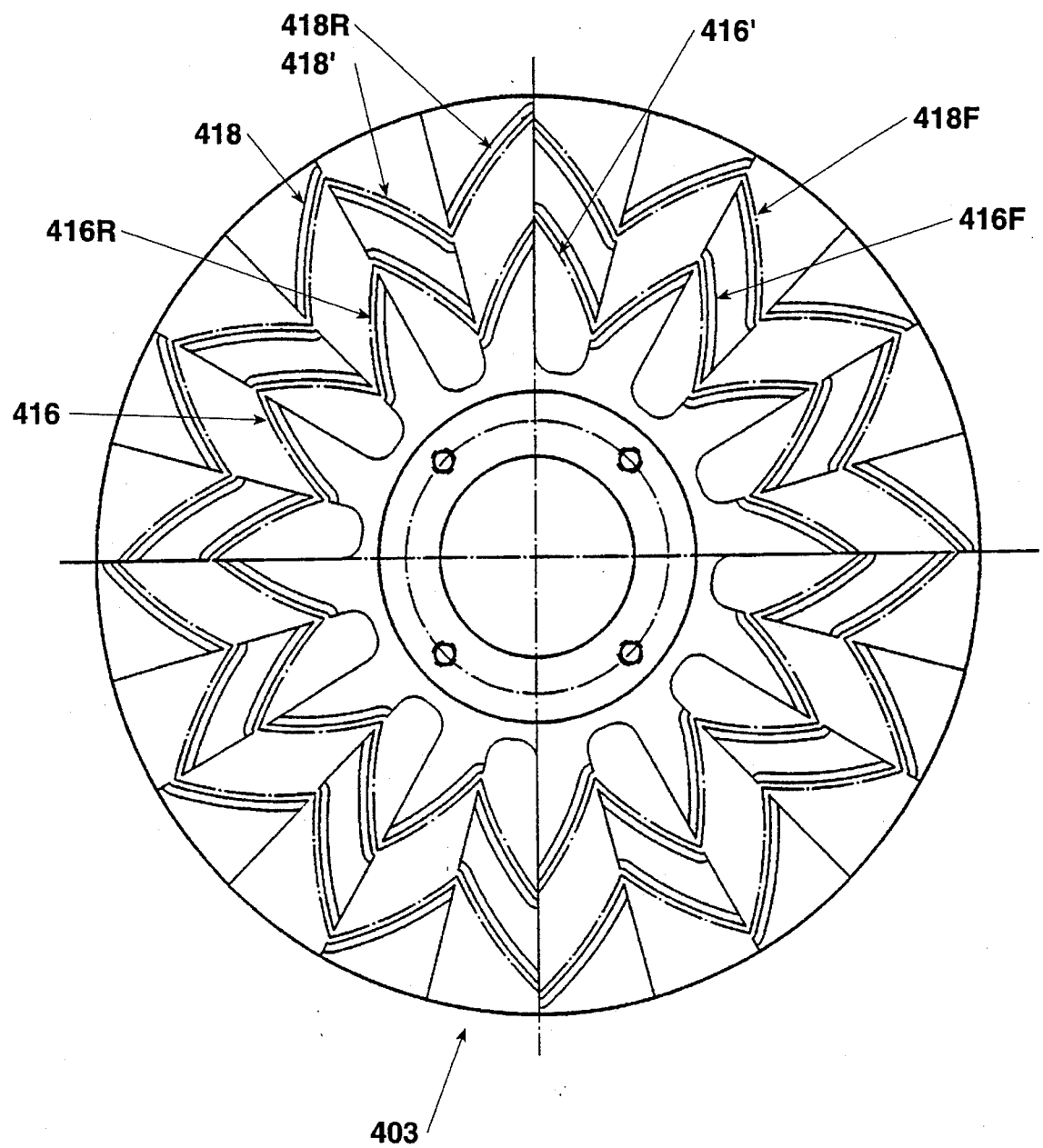
FIG. 8 is a face view of driven grooves 416 and 418 of the driven cam device 403 of FIG. 6.

As seen in FIGS. 7 and 8, the inner sets of flanks 415, 416 and outer sets of flanks 417, 418 have been formed relative to a centerline 415', 416', 417', 418', respectively. As will be appreciated, half of each cam track has been ground away, so that each ball is captured between a half-track drive portion (flank 415 or 417 and half-track driven portion flank 416 or 418), which minimizes ball contact to two points. The balls do not contact the grooves otherwise.

The two sets of cam tracks are necessary to accommodate clockwise and counterclockwise rotation since two-point contact is unidirectional, i.e., it can react in only one direction of rotation, while retainer 402 passively keeps the balls properly located. For example, if the inner set 415/416 are conjugate cam segments that accommodate clockwise rotation of the input shaft of the drive cam device 401, then the outer set 417/418 are conjugate cam segments that accommodate counterclockwise rotation of the input shaft of the drive cam device 401. Thus clockwise rotation is provided by one cam track set and counterclockwise rotation is provided by another cam track set for bi-directional input/output. But only a single set of cooperating two-point contact cams is required for unidirectional outputs.

The segmented drive cam tracks shown in FIG. 7 are in a single lobe configuration similar in function to the single lobe configuration earlier described in this specification. For clockwise rotation, the inner cam track segments 415R and 415F are active in the speed transmission while segments 417R and 417F are benign. For counterclockwise rotation of the drive cam, segments 417R and 417F are active in the speed transmission, while segments 415R and 415F are benign.

FIG. 8 shows a segmented twelve cycle configuration of a driven cam device 403 and is similar in function to the twelve cycle drive cam described earlier in this specification. The outer rise and fall segments 418R and 418F have opposite cam track walls which are repeated for each cycle. The inner segments 416R and 416F contain the opposite set of cam track walls which are also repeated for each cycle.

These two segmented cam tracks are conjugate with the two sets of segmented cam tracks of the drive cam. Like the drive cam tracks, for clockwise rotation the inner segmented cycles 416R and 416F are active in the speed transmission while the outer segmented cycles 418F and 418R are active in the counterclockwise rotation of the drive cam.

Figure 9:
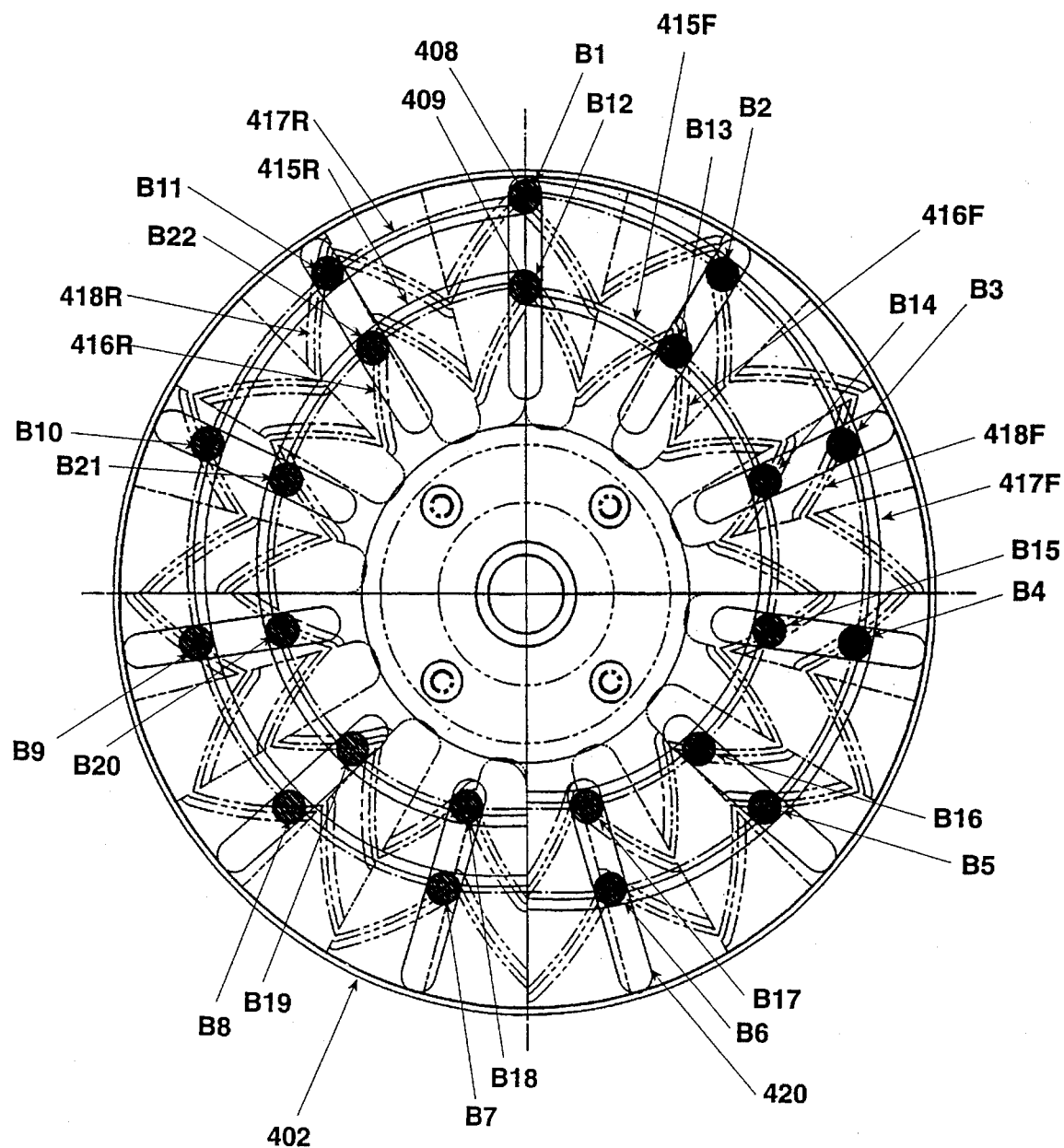
FIG. 9 is a composite view of the drive cam device 401, reaction disk 402 and driven cam device 403, with balls 408–409 in slots 420 of reaction disk 402 of the invention of FIG. 6.

As seen in FIG. 9, the reaction disk 402 provides elongated radial slots 420 for the two sets of balls required to interact with the two concentric conjugate cam grooves. The cams are geometrically configured to not only be conjugate but also deliver synchronous rotation with each other. FIG. 9 illustrates an overview of the drive cam device 401, reaction disk 402 and driven cam device 403 with balls 408–409 in the slots 420 of the reaction disk.

For a clockwise rotation of the drive cam 401, the following conjugate action occurs between the segmented cam tracks of the drive and driven cam tracks. The speed transmission is active between inner segmented cam track 415 of the drive cam and the inner segmented cycles 416 of the driven cam with balls 409 providing the translating means.

Segment 415F of the drive cam displaces balls B13–B17 radially outward at each ball location and causes them to interact with the cam track walls 416F of each segmented cycle of the driven cam and to rotate it counterclockwise, as viewed from the output shaft of the driven cam. Segment 415R of the drive cam displaces balls B18–B22 radially inwardly at each ball location and will cause them to interact with the cam track walls 416R of each segmented cycle of the driven cam and rotate it counterclockwise, as viewed from the output shaft of the driven cam.

Segment 417F of the drive cam cannot displace balls B2–B6 radially and cannot interact with cam track walls 418F of each segmented cycle of the driven cam and cannot participate in the speed transmission and are therefore benign; these balls are free wheeling (and synchronous) during this speed transmission. Segment 417R of the drive cam cannot displace balls B7–B11 radially outward and cannot interact with cam track walls 418R of each segmented cycle of the driven cam and cannot participate in the speed transmission and are therefore benign. These balls also are free wheeling (and synchronous) during this speed transmission.

For a counterclockwise rotation of the drive cam the following conjugate action occurs between the segmented cam tracks of the drive and driven cam tracks. The speed transmission will occur between the segments 417 of the drive cam and 418 of the driven cam and the segments 415 of the drive cam and segmented cycles 416 of the driven cam are benign and synchronous, and do not participate in the speed transmission. Segment 417F of the drive cam displaces balls B2–B6 radially inwardly at each ball location and causes them to interact with cam track walls 418F of the segmented cycles of the driven cam and to rotate it clockwise, as viewed from the output axis of the driven cam. Segment 417R of the drive cam displaces balls B7–B11 radially outwardly at each ball location and causes them to interact with cam track walls 418R of the segmented cycles of the driven cam and to rotate it clockwise, as viewed from the output axis of the driven cam. Now segment 415F of the drive cam cannot displace balls B13–B17 radially outwardly to interact with cam track walls 416F of each segmented cycle of the driven cam and cannot participate in the speed transmission and are therefore benign. The balls are synchronously free-wheeling during this speed transmission. Now segment 415R of the drive cam cannot displace balls B7–B11 B18–B22 radially inwardly to interact with cam crack walls 416R of each segmented cycle of the driven cam and cannot participate in the speed transmission and are therefore benign. The balls are synchronously free-wheeling during this speed transmission.

Balls B1 and B11 are at the transition points of their respective cam interactions and are at this instant not participating in the speed transmission. However, as described earlier in this specification, these balls, and all balls, as they in turn arrive at the transition points, become active for an incremental angular rotation of the drive cam and they then participate in accordance with the direction of rotation of the drive cam.

The conjugate action described above reflects only an instant of time and is continuous between the cams as they interact with the inwardly and outwardly radially displaced balls by the cams' rise and fall modes. Each ball at the appropriate time reaches the outer and inner transition point for each cycle of the drive cam. In the single lobe embodiment, this time was one revolution. Such cooperation allows each cycle of the driven cam to rotate the amount of the subtended angle (30° in this embodiment). The preferred tracks are so configured that the above conjugate action occurs in each track for the respective direction of rotation in synchronous interaction.

The magnitude of the axial force applied by the springs 406 can be predetermined in terms of the maximum torque to be transmitted through the conjugate zero backlash cam devices 401 and 403. The maximum transmitted torque is obtained by determining the separating force resulting from the contact between the balls 408 and 409 with the angular walls of the cam track grooves, 415 with 416 and 417 with 418, for the maximum torque and imposing an axial force with the springs that will be marginally higher. Once the magnitude is determined, it can be equally distributed among the adjusting screws 407 with a calibrated torque wrench, which in turn will assure a balanced axial force application to the preload plate 404. This equally distributed axial force guarantees intimate contact at all ball locations between the drive and driven cam tracks 415–418, eliminating essentially all clearances and providing the most intimate and continuous contact for all the drive elements during operation. This condition results in essentially zero backlash and complete insensitivity to groove enlargement or ball wear, thereby providing prolonged operational life at the highest level of performance.

Thus two concentric segmented sets of cam tracks which are conjugate with each other are provided to accommodate the axial pre-load condition in this embodiment. Each of these sets of cam tracks provides two-point contact, one point on the flank 415 or 417 of the drive cam groove and one point on the flank 416 or 418 of the driven cam groove, as opposed to four-point contact.

Control of the preload and its adjustment can be performed external to the mechanism without opening the housing. The optimal precision and zero backlash, result in significantly prolonged life and ease of adjustment, for any preload within the capacity of the contact stresses. This qualifies this invention as a significant advancement in the field of power transmission, and will significantly improve performance of the presently disclosed and prior art speed converters using cams and reaction disks.

The present invention has many applications wherever zero or low backlash is required. As well, it is a feature of the disclosed invention with multiple sets of tracks that while the input can be easily driven in any direction, the output is irreversible. This irreversible output provides an autobraking feature which is useful in many applications from robotics, to medical and other precision equipment, to hydraulic transmissions, to various combinations of gear assemblies, to hoists and elevator drives, and various other applications where a rotary drive input is employed for driving an output at a converted speed.

The present invention provides a speed converter which is simplified in nature but is robust in transmission capability, and easily manufactured on appropriate shop equipment. As well, the present invention provides a speed converter which is relatively easy to assemble and service and yet has optimized load sharing among the multi-elements that transmit the rotary motive force in the speed converter.

A speed converter made in accordance with the teachings of the present invention will have a ratio of drive cam(s) to driven cam(s) of less than unity for reduction or more than unity for increasing.

It will now be appreciated that method and apparatus are disclosed for reducing backlash in a speed converter using balls to interact between input and output cams. The preferred embodiment features two-point contact of the balls between the drive input and driven output cam tracks under axial preload. Various modifications of the specific embodiments set forth above are also within the spirit and scope of the invention.

What is claimed is:

1. Apparatus for converting a rotary motion input to an output motion, comprising driven track means for driving an output, means for retaining an interacting element, said retaining means having at least one slot, and drive track means for driving said driven track means via at least one interacting element traveling in said retaining means slot, said drive track means and said driven track means comprising a conjugate pair of devices which cooperate together to define a straight path of travel of said element in said slot, each of said driven and driven track means having at least a rise side and at least a fall side, said rise sides forming a rise side pair and said fall sides forming a fall side pair, wherein said interacting element is in intimate contact with one member of each said pair simultaneously without contacting all members of all said pairs, preloading means for axially preloading said drive track means, said driven track means and said interacting element into said intimate contact, and all said means coaxially mounted along a common central axis, said driven track means having at least one cycle, said drive track means having at least one cam cycle for driving said driven track means via said at least one interacting element in said slot, all said means cooperating for converting rotary motion at said input at an input speed to an output speed at said output, said output speed being dictated according to the ratio of the number of said cycles of said drive track means and of said cycles of said driven track means, wherein said ratio is other than unity.

2. The apparatus of claim 1 wherein at least one of said track means makes one-point contact with said interacting element.

3. The apparatus of claim 2 wherein said track means collectively provide two-point contact to said interacting element.

4. The apparatus of claim 1 wherein said interacting element is a ball and said retaining means is a slotted reaction disk.

5. The apparatus of claim 1 wherein one said track means forms an angled flank for said intimate contact.

6. The apparatus of claim 1 wherein said driven track means is not backdriveable.

7. The apparatus of claim 1 wherein one of said drive and driven track means includes an angled flank capable only of unidirectional interaction with the other one of said drive and driven track means.

8. The apparatus of claim 1 further comprising a housing in which a first of said track means is slideably mounted over a shaft along a shaft axis.

9. The apparatus of claim 8 wherein said means for retaining is fixed to said housing.

10. The apparatus of claim 8 further comprising compression springs and axially preloading external adjusting screws which compress said springs between an inner wall of said housing and one of said drive and driven track means.

11. The apparatus of claim 10 wherein said springs are compressed between said housing and a backface of said drive means.

12. The apparatus of claim 10 wherein said drive track means comprises a backface and a camface and said driven track means comprises a backface and a camface, and wherein said springs apply axial preload to the backface and camface of the drive track means and the backface and camface of the drive track means via the at least one interacting elements.

13. The apparatus of claim 1 wherein said drive and driven track means comprise a drive cam track and driven cam track, respectively, each having an angled flank for one-point interaction with said at least one interacting element.

14. The apparatus of claim 13 wherein said retaining means is a slotted reaction disk having a plurality of slots, further comprising a plurality of interacting elements wherein said interacting elements are bails, further comprising compression springs and adjusting screws which compress said springs between a fixed member on a housing of said apparatus and a backface of one of said drive and driven track means, wherein said drive cam track transmits the force of said compression springs to said driven cam track through a group of said balls which are located in said slots of said reaction disk, respectively.

15. The apparatus of claim 14 wherein said balls are in a double row, and two said balls are assigned to a said slot.

16. The apparatus of claim 1 wherein said drive and driven track means together comprise a conjugate pair of devices rotatable about a common axis, a first device of said pair being an input device for supply of angular velocity and rotary motive force and a second device of said pair being an output device further comprising a plurality of interacting elements;

said means for retaining and said interacting elements comprising means for transmitting angular velocity and rotary motive force of said input device to angular velocity and rotary motive force of said output device as said interacting elements are put in motion by said input device, and said input device cooperating with said in-motion interacting elements and said output device for transmitting, through all said in-motion interacting elements, said angular velocity and rotary motive force of said input device to angular velocity and rotary motive force of said output device.

17. Method for converting a rotary motion input to a rotary motion output and for achieving intimate contact between moving elements in use, the method comprising the steps of driving a rotary output with driven track means, driving said driven track means with a drive track means via at least one interacting element traveling in a slot of a slotted retainer, said drive track means and said driven track means comprising a conjugate pair of devices which cooperate together to define a path of travel of said at least one interacting element in said slot, providing each said track means with at least a rise side and at least a fall side, said rise sides forming a rise side pair and said fall sides forming a fall side pair, and axially preloading said track means and said interacting element together, allowing the interacting element contact with ones of said pairs simultaneously and without contacting the others of said pairs.

18. The method of claim 17 wherein said track means collectively make less than four-point contact with said interacting element.

* * * * *